United States Patent
Wu et al.

(10) Patent No.: US 11,545,661 B2
(45) Date of Patent: Jan. 3, 2023

(54) HIGH-CAPACITY AND LONG-LIFE NEGATIVE ELECTRODE HYDROGEN STORAGE MATERIAL OF LA—MG—NI TYPE FOR SECONDARY RECHARGEABLE NICKEL-METAL HYDRIDE BATTERY AND METHOD FOR PREPARING THE SAME

(71) Applicant: Jiangsu JITRI Advanced Energy Materials Research Institute Co., Ltd., Jiangsu (CN)

(72) Inventors: Jianmin Wu, Changzhou (CN); Shaoxiong Zhou, Changzhou (CN)

(73) Assignees: JIANGSU JITRI ADVANCED ENERGY, Jiangsu (CN); MATERIALS RESEARCH INSTITUTE CO., LTD., Jiangsu (CN)

( * ) Notice: Subject to any disclaimer, the term of this patent is extended or adjusted under 35 U.S.C. 154(b) by 0 days.

(21) Appl. No.: 16/955,133

(22) PCT Filed: May 31, 2019

(86) PCT No.: PCT/CN2019/089675
§ 371 (c)(1),
(2) Date: Jun. 18, 2020

(87) PCT Pub. No.: WO2020/151154
PCT Pub. Date: Jul. 30, 2020

(65) Prior Publication Data
US 2021/0218020 A1    Jul. 15, 2021

(30) Foreign Application Priority Data
Jan. 21, 2019 (CN) .......................... 201910053205.9

(51) Int. Cl.
| | |
|---|---|
| H01M 4/38 | (2006.01) |
| C22C 23/00 | (2006.01) |
| H01M 4/46 | (2006.01) |
| H01M 10/054 | (2010.01) |
| H01M 10/30 | (2006.01) |
| C22C 19/03 | (2006.01) |
| H01M 4/02 | (2006.01) |

(52) U.S. Cl.
CPC ............. *H01M 4/383* (2013.01); *C22C 19/03* (2013.01); *C22C 23/00* (2013.01); *H01M 4/466* (2013.01); *H01M 10/054* (2013.01); *H01M 10/30* (2013.01); *H01M 2004/027* (2013.01)

(58) Field of Classification Search
None
See application file for complete search history.

(56) References Cited

FOREIGN PATENT DOCUMENTS

| | | |
|---|---|---|
| GN | 1718814 A | 1/2006 |
| GN | 105274395 A | 1/2016 |
| GN | 107275626 A | 10/2017 |

OTHER PUBLICATIONS

The abstract of Wang et al., "Phase structures and electrochemical performances of La0.67Mg0.33Ni3.0-xAlx(x=0.0~0.35) hydrogen storage alloys" Peop. Rep. China SOURCE: Xiyou Jinshu Cailiao Yu Gongcheng (2006),35 (9), pp. 1379-1382.*
The abstract of Zhang et al. "Study on the structure and electrochemical properties of La0.67Mg0.33Ni3.0-xAlx (x = 0, 0.1,0.2, 0.3) hydrogen storage alloys", Peop. Rep. China SOURCE: Gongneng Cailiao (2005), 36(7), pp. 1034-1037, 1040.*
Sipo, International Search Report issued in IA No. PCT/CN2019/089675, dated Oct. 10, 2019.

* cited by examiner

*Primary Examiner* — Laura Weiner
(74) *Attorney, Agent, or Firm* — Lorenz & Kopf, LLP

(57) ABSTRACT

A high-capacity and long-life negative electrode hydrogen storage material of La—Mg—Ni type for secondary rechargeable nickel-metal hydride battery and a method for preparing the same are provided in the present invention. A chemical formula of the negative electrode hydrogen storage material of La—Mg—Ni type is $La_{1-x-y}Re_xMg_y(Ni_{1-a-b}Al_aM_b)_z$, wherein Re is at least one of Ce, Pr, Nd, Sm, Y, and M is at least one of Ti, Cr, Mo, Nb, Ga, V, Si, Zn, Sn; $0 \leq x \leq 0.10$, $0.3 \leq y \leq 0.5$, $0 < a \leq 0.05$, $0 \leq b \leq 0.02$, $2.3 \leq z < 3.0$. The negative electrode hydrogen storage material of La—Mg—Ni type in the present invention has excellent charge-discharge capacity and cycle life. The negative electrode hydrogen storage material of La—Mg—Ni type can be applied in both common secondary rechargeable nickel-metal hydride battery and secondary rechargeable nickel-metal hydride battery with ultra-low self-discharge and long-term storage performance.

3 Claims, 2 Drawing Sheets

HIGH-CAPACITY AND LONG-LIFE NEGATIVE ELECTRODE HYDROGEN STORAGE MATERIAL OF LA—MG—NI TYPE FOR SECONDARY RECHARGEABLE NICKEL-METAL HYDRIDE BATTERY AND METHOD FOR PREPARING THE SAME

RELATED APPLICATION

This application is the National Stage application under 35 U.S.C. 371 of PCT International Application No. PCT/CN2019/089675, filed on May 31, 2019, which claims priority from Chinese Patent Application No. CN 201910053205.9, filed on Jan. 21, 2019, the contents of which are hereby incorporated by reference in their entirety.

FIELD OF THE APPLICATION

The present invention belongs to the field of battery materials, and particularly relates to a high-capacity and long-life negative electrode hydrogen storage material of La—Mg—Ni type for secondary rechargeable nickel-metal hydride battery.

BACKGROUND OF THE APPLICATION

Since metal hydride-nickel batteries were put on the market in the 1990s, they have been welcomed widely and have a higher and higher market share as they have the characteristics such as high capacity, long life, no memory effect, no environmental pollution and the like. The types of batteries have also evolved from AA, AAA of ordinary batteries to a variety of others. The products have been widely used in electric tools, household appliances, computers, aerospace s, communications, mopeds and the like, which develop very rapidly. The requests on battery performance have also become higher and higher as the application fields of metal hydride-nickel batteries increase. Especially people have gradually realized that the storage performance and self-discharge characteristic of the battery have a great impact on the application of the battery in recent years. The bad storage performance of the battery directly results in that the battery is scrapped, and too large self-discharge of the battery is not good for the use of the battery and meanwhile leads to the waste of electric energy. Therefore, the research and development of the battery with long-term storage and low self-discharge characteristics has been a hot topic in recent years.

The self-discharge of the battery is generated, mainly because in the non-operating state, oxygen in the positive electrode releases and combines with the hydrogen in the negative electrode on the one hand. On the other hand, elements such as Co and Mn in the negative electrode and other elements, which may be dissolved in the alkaline electrolyte, are dissolved in the electrolyte and then will be deposited on the separator, thereby accelerating the reduction of the positive electrode. For this, people have done a lot of work, such as coating the positive electrode powder with cobalt, improving the separator and the electrolyte, adding some stabilizing additives to the electrode, and the like. These works have indeed improved the self-discharge characteristic of nickel-metal hydride batteries, but still have not solved the problem fundamentally.

In addition, as shown in Tables 1 and 2 below, with regard to rare earth intermetallic compounds being composed of $AB_x$ ($LaNi_2$, $LaNi_3$, $La_2Ni_7$ and $LaNi_5$), as the content of the rare earth on the A side increase, a hydrogen absorption content of the compounds increase and the theoretical electrochemical capacity thereof are also higher, at the same time the equilibrium hydrogen pressure and temperature of hydrogen absorption and desorption also increase (see Table 1), which make it difficult to be applied practically.

TABLE 1 structure and performance of alloys and hydrides of $LaNi_2$, $LaNi_3$, $La_2Ni_7$ and $LaNi_5$

| Alloy | Structure | Hydride | Structure | Maximum hydrogen absorption content H/M | Maximum hydrogen absorption content wt. % | Equilibrium hydrogen pressure (atm) | Temperature of hydrogen absorption and desorption (° C.) |
|---|---|---|---|---|---|---|---|
| $LaNi_2$ | $MgCu_2$ | $LaNi_2H_{4.5}$ | Amorphous | 1.5 | 1.7 | $5 \times 10^{-3}$ | 252 |
| $LaNi_3$ | $PuNi_3$ | $LaNi_3H_5$ | Amorphous | 1.25 | 1.6 | <1 | 200 |
| $La_2Ni_7$ | $Ce_2Ni_7$ | $La_2Ni_7H_{10}$ | Amorphous | 1.17 | 1.43 | 0.6 | 25 |
| $LaNi_5$ | $CaCu_5$ | $LaNi_5H_6$ | $CaCu_5$ | 1.0 | 1.4 | 2 | 25 |

TABLE 2 theoretical electrochemical capacity of $AB_x$($LaNi_2$, $LaNi_3$, $La_2Ni_7$, $La_5Ni_{19}$ and $LaNi_5$)alloys

| Alloy series | Structure expression of alloy | Molecular formula of hydride | H/(A + B) | Theoretical electrochemical capacity (mAh/g) |
|---|---|---|---|---|
| $AB_2$ | $AB_2$=($AB_2$) | $AB_2H_{4.5}$ | 1.5 | 470 |
| $AB_3$ | $AB_3$=1/3($AB_5$) + 2/3($AB_2$) | $AB_3H_5$ | 1.25 | 425 |
| $A_2B_7$ | $A_2B_7$=($AB_5$) + ($AB_2$) | $A_2B_7H_{10.5}$ | 1.17 | 408 |
| $A_5B_{19}$ | $A_5B_{19}$=3($AB_5$) + 2($AB_2$) | $A_5B_{19}H_{27}$ | 1.125 | 399 |
| $AB_5$ | $AB_5$=($AB_5$) | $AB_5H_6$ | 1 | 372 |

SUMMARY

An object of the present invention is to provide a high-capacity and long-life negative electrode hydrogen storage material of La—Mg—Ni type for secondary rechargeable nickel-metal hydride battery, and the negative electrode hydrogen storage material can be stored for a long time and has a low self-discharge.

The technical solution of the present invention is as follows:

A high-capacity and long-life negative electrode hydrogen storage material of La—Mg—Ni type for secondary rechargeable nickel-metal hydride battery, a chemical formula (atomic ratio composition) of the La—Mg—Ni type negative electrode hydrogen storage material is $La_{1-x-y}Re_xMg_y(Ni_{1-a-b}Al_aM_b)_z$, wherein Re is at least one of Ce, Pr, Nd, Sm, Y, and M is at least one of Ti, Cr, Mo, Nb, Ga, V, Si, Zn, Sn; $0 \leq x \leq 0.10$, $0.3 \leq y \leq 0.5$, $0 < a \leq 0.05$, $0 \leq b \leq 0.02$, $2.3 \leq z < 3.0$.

In the above-mentioned high-capacity and long-life negative electrode hydrogen storage material of La—Mg—Ni type for secondary rechargeable nickel-metal hydride battery, as one preferred embodiment, $2.7 \leq z < 3.0$, more preferably, $2.75 \leq z < 3.0$.

In the above-mentioned high-capacity and long-life negative electrode hydrogen storage material of La—Mg—Ni type for secondary rechargeable nickel-metal hydride battery, as one preferred embodiment, the chemical formula (atomic ratio composition) of the negative electrode hydrogen storage material of La—Mg—Ni type is:

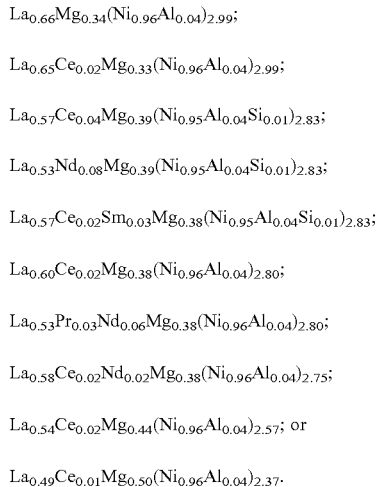

$La_{0.66}Mg_{0.34}(Ni_{0.96}Al_{0.04})_{2.99}$;

$La_{0.65}Ce_{0.02}Mg_{0.33}(Ni_{0.96}Al_{0.04})_{2.99}$;

$La_{0.57}Ce_{0.04}Mg_{0.39}(Ni_{0.95}Al_{0.04}Si_{0.01})_{2.83}$;

$La_{0.53}Nd_{0.08}Mg_{0.39}(Ni_{0.95}Al_{0.04}Si_{0.01})_{2.83}$;

$La_{0.57}Ce_{0.02}Sm_{0.03}Mg_{0.38}(Ni_{0.95}Al_{0.04}Si_{0.01})_{2.83}$;

$La_{0.60}Ce_{0.02}Mg_{0.38}(Ni_{0.96}Al_{0.04})_{2.80}$;

$La_{0.53}Pr_{0.03}Nd_{0.06}Mg_{0.38}(Ni_{0.96}Al_{0.04})_{2.80}$;

$La_{0.58}Ce_{0.02}Nd_{0.02}Mg_{0.38}(Ni_{0.96}Al_{0.04})_{2.75}$;

$La_{0.54}Ce_{0.02}Mg_{0.44}(Ni_{0.96}Al_{0.04})_{2.57}$; or $La_{0.49}Ce_{0.01}Mg_{0.50}(Ni_{0.96}Al_{0.04})_{2.37}$.

In the above-mentioned high-capacity and long-life negative electrode hydrogen storage material of La—Mg—Ni type for secondary rechargeable nickel-metal hydride battery, as one preferred embodiment, the chemical formula of the negative electrode hydrogen storage material of La—Mg—Ni type is:

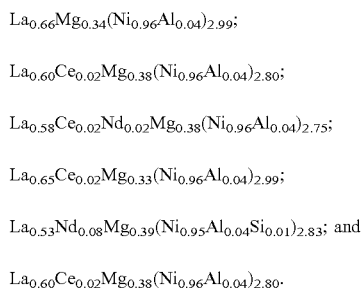

$La_{0.66}Mg_{0.34}(Ni_{0.96}Al_{0.04})_{2.99}$;

$La_{0.60}Ce_{0.02}Mg_{0.38}(Ni_{0.96}Al_{0.04})_{2.80}$;

$La_{0.58}Ce_{0.02}Nd_{0.02}Mg_{0.38}(Ni_{0.96}Al_{0.04})_{2.75}$;

$La_{0.65}Ce_{0.02}Mg_{0.33}(Ni_{0.96}Al_{0.04})_{2.99}$;

$La_{0.53}Nd_{0.08}Mg_{0.39}(Ni_{0.95}Al_{0.04}Si_{0.01})_{2.83}$; and $La_{0.60}Ce_{0.02}Mg_{0.38}(Ni_{0.96}Al_{0.04})_{2.80}$.

In the above-mentioned high-capacity and long-life negative electrode hydrogen storage material of La—Mg—Ni type for secondary rechargeable nickel-metal hydride battery, as one preferred embodiment, the negative electrode hydrogen storage material of La—Mg—Ni type includes $LaMgNi_4$ phase, $LaMg_{12}$ phase, $La_2Ni_7$ phase of $Ce_2Ni_7$ type and $LaNi_5$ phase. Preferably, the content of the $LaMgNi_4$ phase and $LaMg_{12}$ phase increase as z-value decreases.

A multiphase negative electrode hydrogen storage material in the present invention which is mainly collectively composed of compounds of $LaMgNi_4$ phase, $LaMg_{12}$ phase, $La_2Ni_7$ phase of $Ce_2Ni_7$ type and $LaNi_5$ phase can be prepared by the conventional intermediate frequency induction smelting method, and also can be prepared by the quick-setting flake method and the single-roll melt spinning method.

A method for preparing the high-capacity and long-life negative electrode hydrogen storage material of La—Mg—Ni type for secondary rechargeable nickel-metal hydride battery comprises:

a step of raw material preparation: weighing raw materials containing corresponding element according to an atomic ratio of each element in $La_{1-x-y}Re_xMg_y(Ni_{1-a-b}Al_aM_b)_z$, wherein Re is at least one of Ce, Pr, Nd, Sm, Y; and M is at least one of Ti, Cr, Mo, Nb, Ga, V, Si, Zn, Sn; $0 \leq x \leq 0.10$, $0.3 \leq y \leq 0.5$, $0 < a \leq 0.05$, $0 \leq b \leq 0.02$, $2.3 \leq z < 3.0$;

a step of smelting: smelting the raw materials in a protective atmosphere to obtain a smelting liquid;

a step of casting: pouring the smelting liquid into a water-cooled ingot mould in a protective atmosphere for casting to form an ingot casting.

In the method for preparing the high-capacity and long-life negative electrode hydrogen storage material of La—Mg—Ni type for secondary rechargeable nickel-metal hydride battery, as one preferred embodiment, the method for preparing further comprises a step of homogenization treatment. The step of homogenization treatment comprises performing homogenization treatment on the ingot casting in a protective atmosphere and followed by performing a cooling. Preferably, in the step of homogenization treatment, a temperature of the homogenization treatment is 850~1000° C. (such as 860° C., 880° C., 900° C., 920° C., 940° C., 960° C., 980° C., 990° C.), and a holding time is 1-30 h (such as 2 h, 5 h, 8 h, 10 h, 13 h, 15 h, 18 h, 20 h, 22 h, 25 h, 27 h, 29 h). Preferably, the holding time is 7-12 h. Preferably, the cooling is that a protective gas of low temperature is introduced into a device for the homogenization treatment and stirred with a fan, or the cooling is a furnace cooling. More preferably, the protective gas is an argon gas, a helium gas or a mixture gas of the argon gas and the helium gas (they can be mixed in any proportion). The faster the cooling, the better the electrochemical hydrogen absorption and desorption kinetics performance of the material and the longer the cycle life. In the above-mentioned method for preparing the high-capacity and long-life negative electrode hydrogen storage material of La—Mg—Ni type for secondary rechargeable nickel-metal hydride battery, as one preferred embodiment, in the step of raw material preparation, the raw materials containing Mg element is pure Mg, La—Mg alloy, Re—Mg alloy or Ni—Mg alloy. Preferably, 2.75 $z < 3.0$.

In the above-mentioned method for preparing the high-capacity and long-life negative electrode hydrogen storage material of La—Mg—Ni type for secondary rechargeable nickel-metal hydride battery, as one preferred embodiment, in the step of smelting, a maximum temperature of the smelting should be controlled at 1400±20° C.; Preferably, the protective atmosphere is the argon gas, the helium gas, or the mixture gas of the argon gas and the helium gas (they can be mixed in any proportion).

In the above-mentioned method for preparing the high-capacity and long-life negative electrode hydrogen storage material of La—Mg—Ni type for secondary rechargeable nickel-metal hydride battery, as one preferred embodiment, in the step of casting, a thickness of the ingot casting is no larger than 35 mm. The thinner the thickness of the ingot casting, the better, and the faster the cooling, the better, which is good for obtaining the ingot casting with uniform composition.

A secondary rechargeable nickel-metal hydride battery contains the above-mentioned negative electrode hydrogen storage material of La—Mg—Ni type.

The high-capacity and long-life negative electrode hydrogen storage material of La—Mg—Ni type for secondary rechargeable nickel-metal hydride battery $La_{1-x-y}Re_xMg_y(Ni_{1-a-b}Al_aM_b)_z$ in the present invention is an intermetallic compound which is composed of elements which easily generate stable hydrides (such as La, Ce, Pr, Nd, Sm, Y, Mg and the like) and other elements (such as Ni, Ti, Cr, Mo, Nb, Ga, V, Si, Zn, Sn and the like). Its electrochemical charge and discharge capacities mainly come from the electron transfer of hydrogen ions in the electrolyte during the redox process on the hydrogen storage alloy electrode during the hydrogen absorption and desorption. The electrochemical charge and discharge reactions of nickel-metal hydride battery are generally shown as follows.

Charge Reaction:

At the negative electrode, the water in the electrolyte is decomposed into hydrogen ions and hydroxide ions when one electrode potential is applied to the negative electrode. A hydrogen ion obtains an electron on the surface of the negative electrode hydrogen storage material and become a hydrogen atom, which are absorbed into the alloy. The hydroxide ion is left in the electrolyte:

$$Alloy+H_2O+e^- \rightarrow Alloy\,[H]+OH^- \qquad (1)$$

Wherein Alloy represents the hydrogen storage alloy.

At the positive electrode, the divalent nickel in $Ni(OH)_2$ loses one electron to be oxidized to the trivalent nickel, which is combined with hydroxide ion in the electrolyte to become NiOOH:

$$Ni(OH)_2+OH^- \rightarrow NiOOH+H_2O+e^- \qquad (2)$$

Discharge Reaction:

At the negative electrode, the hydrogen absorbed in the hydrogen storage alloy is released and combines with the hydroxide ion in the electrolyte to form water. Meanwhile one electron is contributed to form a current.

$$Alloy\,[H]+OH^- \rightarrow Alloy+H_2O+e^- \qquad (3)$$

At the positive electrode, NiOOH obtains one electron to be reduced to $Ni(OH)_2$ with low valence state and hydroxide ion is released into the electrolyte.

$$NiOOH+H_2O+e^- \rightarrow Ni(OH)_2+OH^- \qquad (4)$$

Compared with the hydrogen storage material of $AB_5$ type sold in the market at present (such as conventional negative electrode hydrogen storage material $MmNi_{3.55}Co_{0.75}Mn_{0.4}Al_{0.3}$ prepared by the same smelting process, Mm is mixed rare earth metallic elements and is composed of element La, Ce, Nd, Pr), a multiphase negative electrode hydrogen storage material $La_{1-z-y}Re_xMg_y(Ni_{1-a-b}Al_aM_b)_z$ in the present invention (Re is at least one of element Ce, Pr, Nd, Sm, Y and the like; M is at least one of element Ti, Cr, Mo, Nb, Ga, V, Si, Zn, Sn and the like; and the value of x, y, a, b and z respectively meet the following conditions. That is, $0 \le x \le 0.10$, $0.3 \le y \le 0.5$, $0 < a \le 0.05$, $0 \le b \le 0.02$, $2.3 \le z < 3.0$) has a higher electrochemical charge and discharge capacity and an approximate electrochemical charge and discharge cycle life, and does not contain Co, Mn and other elements that can be dissolved in alkaline solutions.

The multiphase hydrogen storage material in the present invention can be used for preparing the negative electrode of metal hydride-nickel battery. The negative electrode using the multiphase hydrogen storage material in the present invention can meet the applications of the common high-capacity and long-life secondary rechargeable nickel-metal hydride battery, and also can meet the applications of the secondary rechargeable nickel-metal hydride battery with excellent ultra-low self-discharge and long-term storage performance.

Compared with the prior art, the present invention has the following beneficial effects.

(1) Compared with the hydrogen storage material of $AB_5$ type sold in the market at present (such as conventional negative electrode hydrogen storage material $MmNi_{3.55}Co_{0.75}Mn_{0.4}Al_{0.3}$ prepared by the same smelting process), the multiphase negative electrode hydrogen storage material $La_{1-x-y}Re_xMg_y(Ni_{1-a-b}Al_aM_b)_z$ in the present invention which is collectively composed of compounds of $LaMgNi_4$ phase, $LaMg_{12}$ phase, $La_2Ni_7$ phase of $Ce_2Ni_7$ type and $LaNi_5$ phase (the value of x, y, a, b and z respectively meet the following conditions, that is $0 \le x \le 0.10$, $0.3 \le y \le 0.5$, $0 < a \le 0.05$, $0 \le b \le 0.02$, $2.3 \le z < 3.0$) has a significantly increased electrochemical charge and discharge capacity, and an excellent cycle life.

(2) The nickel-metal hydride battery which is prepared using the multiphase hydrogen storage material collectively composed of compounds of $LaMgNi_4$ phase, $LaMg_{12}$ phase, $La_2Ni_7$ phase of $Ce_2Ni_7$ type and $LaNi_5$ phase in present invention has excellent long-term storage characteristic and ultra-low self-discharge, which are much better than those of commercially available nickel-metal hydride battery.

DETAILED DESCRIPTION OF THE EMBODIMENTS

Figure 1:
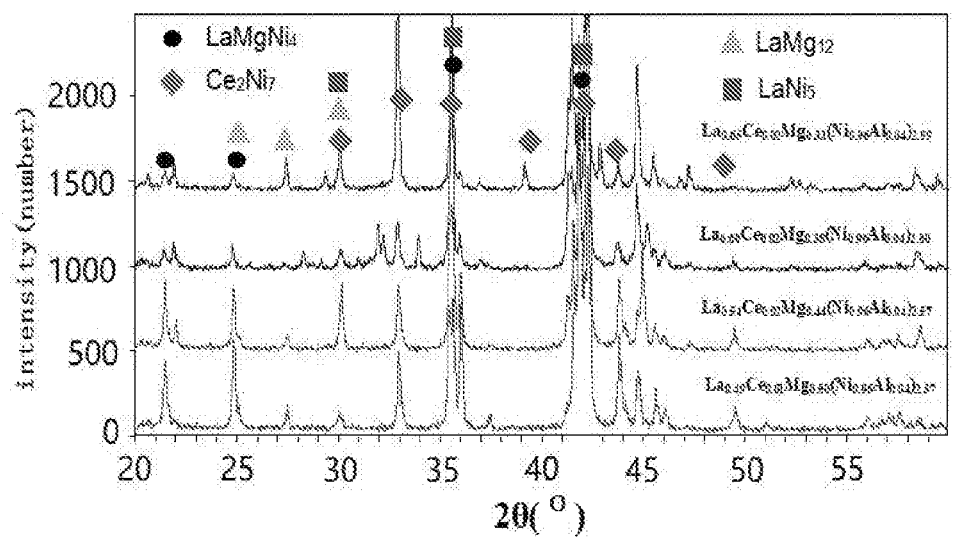
FIG. 1 is an X-ray diffraction pattern of the samples of $La_{0.65}Ce_{0.02}Mg_{0.33}(Ni_{0.96}Al_{0.04})_{2.99}$ in example 2, $La_{0.60}Ce_{0.02}Mg_{0.38}(Ni_{0.96}Al_{0.04})_{2.80}$ in example 6, $La_{0.54}Ce_{0.02}Mg_{0.44}(Ni_{0.96}Al_{0.04})_{2.57}$ in example 9 and $La_{0.49}Ce_{0.01}Mg_{0.50}(Ni_{0.96}Al_{0.04})_{2.37}$ in example 10 in the present invention.

The present invention is described in detail below by examples in combination with the drawings.

EXAMPLE

Raw materials are proportioned according to the weight percentage of each element of alloy in table 3, and the proportioned raw materials of alloy are smelt in the intermediate frequency induction melting furnace into which an argon gas, a helium gas, or a mixture gas composed of the argon gas and the helium gas(they can be mixed in any proportion) have been introduced after the intermediate frequency induction melting furnace had been vacuumized. During the smelting, the maximum temperature of molten steel is controlled at 1400±20° C. Then the molten steel is cast into a water-cooled ingot mould to form an ingot casting with the thickness no larger than 35 mm. The ingot casting is taken out from the melting furnace after cooling and is transferred into vacuum heat treatment furnace to perform homogenization treatment. Before performing homogenization treatment, the argon gas, the helium gas, or the mixture of the argon gas and the helium gas (they can be mixed in any proportion) are introduced into the vacuum heat treatment furnace which has been vacuumized. A temperature of the homogenization treatment is 850~1000° C. and a holding time is 1~30 h. After the holding time ends, the cool argon gas, the cool helium gas, or the cool mixture gas of the argon gas and the helium gas (they can be mixed in any proportion) are introduced into vacuum heat treatment furnace for cooling. The ingot casting is taken out after it is cooled to the room temperature. The temperature and time of the homogenization treatment of the ingot casting in each example in Table 3 are determined according to the composition for synthesis and the thickness of the ingot casting.

powder are mixed in a ratio of 1:4, and are cold-pressed into a round cake (shape) with diameter (d) being 15 mm. Then the round cake is wrapped totally using a nickel foam on which nickel strap is weld and the openings of the nickel foam are sealed by a spot-welder, and it is used as the negative electrode. The positive electrode used is the same [Ni(OH)$_2$—NiOOH] electrode as nickel-metal hydride battery. The capacity of the positive electrode is designed to be much higher than that of the negative electrode so that the negative electrode material can reach full saturation during charging. [Hg/HgO/6M KOH] is the reference electrode. In the process of the electrode performance test, firstly the hydrogen storage negative electrode material is fully activated at the current density of 60 mA/g at 30° C., wherein the system of activation is as follows: charging 450 min with the current density of 60 mA/g, pausing for 15 minutes, and then discharging at a current density of 60 mA/g until the electrode potential of the negative electrode hydrogen storage alloy powder is −0.5V relative to the electrode potential of the reference electrode, then the next charge-discharge cycle is performed. As the activation number increases, the electrochemical discharge capacity of the negative electrode hydrogen storage alloy powder will gradually increase and become relatively stable after reaching a maximum value. At this time, the activation ends. The maximum value is defined as the electrochemical hydrogen absorption and desorption

TABLE 3 composition comparison of examples 1-10 in the present invention and comparative example (wt %)

| | No. | Composition | Weight percentage(wt %) | | | | | | | | |
|---|---|---|---|---|---|---|---|---|---|---|---|
| | | | La | Ce | Pr | Nd | Sm | Mg | Ni | Al | Si |
| The present invention | Example 1 | La$_{0.66}$Mg$_{0.34}$(Ni$_{0.96}$Al$_{0.04}$)$_{2.99}$ | 33.97 | — | — | — | — | 2.99 | 61.89 | 1.14 | — |
| | Example 2 | La$_{0.65}$Ce$_{0.02}$Mg$_{0.33}$(Ni$_{0.96}$Al$_{0.04}$)$_{2.99}$ | 33.06 | 0.91 | — | — | — | 2.99 | 61.89 | 1.14 | — |
| | Example 3 | La$_{0.57}$Ce$_{0.04}$Mg$_{0.39}$(Ni$_{0.95}$Al$_{0.04}$Si$_{0.01}$)$_{2.83}$ | 31.10 | 2.24 | — | — | — | 3.67 | 61.60 | 1.12 | 0.27 |
| | Example 4 | La$_{0.53}$Nd$_{0.08}$Mg$_{0.39}$(Ni$_{0.95}$Al$_{0.04}$Si$_{0.01}$)$_{2.83}$ | 28.84 | — | — | 4.61 | — | 3.67 | 61.50 | 1.12 | 0.27 |
| | Example 5 | La$_{0.57}$Ce$_{0.02}$Sm$_{0.03}$Mg$_{0.38}$(Ni$_{0.95}$Al$_{0.04}$Si$_{0.01}$)$_{2.83}$ | 31.10 | 0.90 | — | — | 1.35 | 3.67 | 61.60 | 1.12 | 0.27 |
| | Example 6 | La$_{0.60}$Ce$_{0.02}$Mg$_{0.38}$(Ni$_{0.96}$Al$_{0.04}$)$_{2.80}$ | 32.53 | 0.90 | — | — | — | 3.68 | 61.77 | 1.13 | — |
| | Example 7 | La$_{0.53}$Pr$_{0.03}$Nd$_{0.06}$Mg$_{0.38}$(Ni$_{0.96}$Al$_{0.04}$)$_{280}$ | 28.93 | — | 1.35 | 3.24 | — | 3.68 | 61.69 | 1.12 | — |
| | Example 8 | La$_{0.58}$Ce$_{0.02}$Nd$_{0.02}$Mg$_{0.38}$(Ni$_{0.96}$Al$_{0.04}$)$_{2.75}$ | 31.81 | 1.36 | — | 0.93 | — | 3.62 | 61.16 | 1.13 | — |
| | Example 9 | La$_{0.54}$Ce$_{0.02}$Mg$_{0.44}$(Ni$_{0.96}$Al$_{0.04}$)$_{2.57}$ | 31.81 | 0.88 | — | — | — | 4.60 | 61.61 | 1.10 | — |
| | Example 10 | La$_{0.49}$Ce$_{0.01}$Mg$_{0.50}$(Ni$_{0.96}$Al$_{0.04}$)$_{2.37}$ | 31.04 | 0.86 | — | — | — | 5.58 | 61.45 | 1.07 | — |

| | NO. | Composition | La | Ce | Pr | Nd | Mg | Ni | Co | Mn | Al |
|---|---|---|---|---|---|---|---|---|---|---|---|
| Comparative example | Comparative example 1 | MmNi$_{3.55}$Co$_{0.75}$Mn$_{0.4}$Al$_{0.3}$ | 21.83 | 7.61 | 0.99 | 2.65 | — | 49.34 | 10.47 | 5.20 | 1.92 |

Test Example

1) The X-ray diffraction tests are made on the samples of La$_{0.65}$Ce$_{0.02}$Mg$_{0.33}$(Ni$_{0.96}$Al$_{0.04}$)$_{2.99}$ in example 2, La$_{0.60}$Ce$_{0.02}$Mg$_{0.38}$(Ni$_{0.96}$Al$_{0.04}$)$_{2.80}$ in example 6, La$_{0.54}$Ce$_{0.02}$Mg$_{0.44}$(Ni$_{0.96}$Al$_{0.04}$)$_{2.57}$ in example 9 and La$_{0.49}$Ce$_{0.01}$Mg$_{0.50}$(Ni$_{0.96}$Al$_{0.04}$)$_{2.37}$ in example 10. The results are shown in FIG. 1. The results of the X-ray diffraction in FIG. 1 demonstate that the compounds shown in example 2, 6, 9, 10 are mainly collectively composed of LaMgNi$_4$ phase, LaMg$_{12}$ phase, La$_2$Ni$_7$ phase of Ce$_2$Ni$_7$ type and LaNi$_5$ phase, wherein the contents of LaMgNi$_4$ phase and LaMg$_{12}$ phase increase as the z-value decreases.

2) The test of maximum electrochemical capacity and activation number:
Firstly, the hydrogen storage alloy ingot casting obtained in the above-mentioned example are ground into an alloy powder of less than 200 mesh at room temperature. Then 0.25 g alloy powder of less than 200 mesh and a nickel capacity of the material at 30° C., and the number of charge-discharge cycles required to obtain this maximum is called the activation number. Table 4 shows the results of the maximum electrochemical capacity and activation number of the hydrogen storage material in examples 1-10 and comparative example 1 at 30° C. and the charge-discharge current density of 60 mA/g according to the above-mentioned method.

Cycle life test: firstly, the test samples are activated with a current density of 60 mA/g at 30° C. according to the above-mentioned method for testing the capacity and activation number. After the activation, the hydrogen storage negative electrode material is charged for 85 min with the current density of 60 mA/g at 30° C. After charging, there is a pause of 15 minutes. Then the hydrogen storage negative electrode material is discharged until the electrode potential of the hydrogen storage negative electrode materials is −0.5V relative to the electrode potential of the reference electrode. Then the next charge-discharge cycle is performed. For comparison conveniently, the cycle life of the samples is defined as the number of cycles when its capacity drops to 60% of the maximum capacity in the case of being discharged at the current density of 300 mA/g. Table 4 shows the results of the cycle life of hydrogen storage material in examples 1-10 and comparative example 1 according to the above-mentioned method.

TABLE 4

| | No. | Composition | Activation number | Maximum capacity (mAh/g) | Cycle life |
|---|---|---|---|---|---|
| The present invention | Example 1 | $La_{0.66}Mg_{0.34}(Ni_{0.96}Al_{0.04})_{2.99}$ | 3 | 381 | 435 |
| | Example 2 | $La_{0.65}Ce_{0.02}Mg_{0.33}(Ni_{0.96}Al_{0.04})_{2.99}$ | 3 | 373 | 452 |
| | Example 3 | $La_{0.57}Ce_{0.04}Mg_{0.39}(Ni_{0.95}Al_{0.04}Si_{0.01})_{2.83}$ | 3 | 362 | 430 |
| | Example 4 | $La_{0.57}Nd_{0.08}Mg_{0.39}(Ni_{0.95}Al_{0.04}Si_{0.01})_{2.83}$ | 3 | 361 | 510 |
| | Example 5 | $La_{0.57}Ce_{0.02}Sm_{0.03}Mg_{0.38}(Ni_{0.95}Al_{0.04}Si_{0.01})_{2.83}$ | 3 | 356 | 443 |
| | Example 6 | $La_{0.60}Ce_{0.02}Mg_{0.38}(Ni_{0.96}Al_{0.04})_{2.80}$ | 3 | 372 | 451 |
| | Example 7 | $La_{0.53}Pr_{0.03}Nd_{0.06}Mg_{0.38}(Ni_{0.96}Al_{0.04})_{2.80}$ | 3 | 376 | 462 |
| | Example 8 | $La_{0.58}Ce_{0.02}Nd_{0.02}Mg_{0.38}(Ni_{0.96}Al_{0.04})_{2.75}$ | 3 | 378 | 449 |
| | Example 9 | $La_{0.54}Ce_{0.02}Mg_{0.44}(Ni_{0.96}Al_{0.04})_{2.57}$ | 3 | 356 | 133 |
| | Example 10 | $La_{0.49}Ce_{0.01}Mg_{0.50}(Ni_{0.96}Al_{0.04})_{2.37}$ | 3 | 349 | 93 |
| Comparative example | Comparative Example 1 | $MmNi_{3.55}Co_{0.75}Mn_{0.4}Al_{0.3}$ | 3 | 328 | 565 |

It can be known from the data in Table 4 that the hydrogen storage material obtained in the present invention have a higher capacity, and especially when the content of z on the B side is $2.75 \leq z < 3.0$, both the capacity and the cycle life of the multiphase hydrogen storage material are good. A small amount of Ce, Pr, Nd instead of La can improve the capacity and the cycle life of the materials, especially Pr and Nd are more beneficial to the improvement of the capacity and the cycle life. Compared with the conventional alloy of $AB_5$ type, although the life is slightly worse, yet the capacity has greatly increased. The maximum electrochemical capacity thereof exceed 370 mAh/g, which is much higher than the electrochemical capacity value of hydrogen storage material of $AB_5$ type currently sold on the market.

3) An AAA800 battery is made of the sample of $La_{0.53}Pr_{0.03}Nd_{0.06}Mg_{0.38}(Ni_{0.96}Al_{0.04})_{2.80}$ (Example 7) and $MmNi_{3.55}Co_{0.75}Mn_{0.4}Al_{0.3}$ hydrogen storage alloy of $AB_5$ type(Comparative example 1), and a self-discharge performance thereof are studied.

The method for manufacturing the batteries is specifically:

(a) Negative electrode:

Continuous gum dipping, drying and roll pressing are performed to obtain the electrode plate. The total mass of electrode plate is 4.40~4.45 g, the net amount of powder is 3.68~3.73 g;

Size: 68±0.5 (mm)×38±0.1 (mm)×(0.25~0.28) (mm);

Copper mesh: 37.6 (mm)×0.25 (mm); surface density of copper mesh is 260±20 (g/m²), and 260 (g/m²) is taken to be used in calculation.

The mass of substrate: m=0.068×(0.038+0.005)×260/1.05=0.72 (g);

(b) Positive electrode:

The mass of electrode plate (tail serging) is 3.82~3.87 g;

Mass ratio in formula: spherical nickel hydroxide $Ni(OH)_2$ 51%;

Cobalt-coated spherical nickel hydroxide $Ni(OH)_2$ 45%;

Cobalt Monoxide: 3%;

Yttrium oxide: 1%.

Size: 43.5±0.3×38±0.2×0.72~0.75 (mm); the surface density of nickel foam: 280 g/m²;

Substrate: m=0.0435×0.038×280/1.05+0.10=0.54 (g);

The net mass of powder: 3.28~3.33 g.

(c) Electrolyte:

| Formula of the electrolyte | | | | | | | |
|---|---|---|---|---|---|---|---|
| | proportion (wt) | | | | | Specific gravity | Concentration of OH⁻ |
| No. | LiOH•H₂O | NaOH | KOH | H₂O | Ba(OH)₂•8H₂O | g/cm³ | mol/L |
| 1 | 90 | 780 | 220 | 2370 | 2.37 | 1.287 ± 0.002 | 8.4~8.6 |

The amount of electrolyte injected: m=1.15-1.17 g/each battery.

(d) Separator: FV4384; 116×41×0.12 (mm);

(e) The pressure of cap: 2.6~2.8 MPa;

(f) Steel can (shell): h43.6 (mm)×Ø10.10 (mm)×t0.15 (mm);

(g) The activation of battery:

The battery is placed for 48~60 hours in an environment of 25~30° C., and then the charge-discharge activation is performed for two times.

The first charge-discharge activation: charging for 3 h at 0.05 C, then charging for 4 h at 0.2 C, then charging for 5 h at 0.1 C, discharging to 1V at 1 C and then discharging to 1V at 0.2 C.

The second charge-discharge activation: charging for 2 h at 0.5 C, then charging for 2 h at 0.2 C, discharging to 1V at 1 C and then discharging to 1V at 0.2 C.

(h) Test of a capacity retention rate and a capacity recovery rate

Figure 2A:
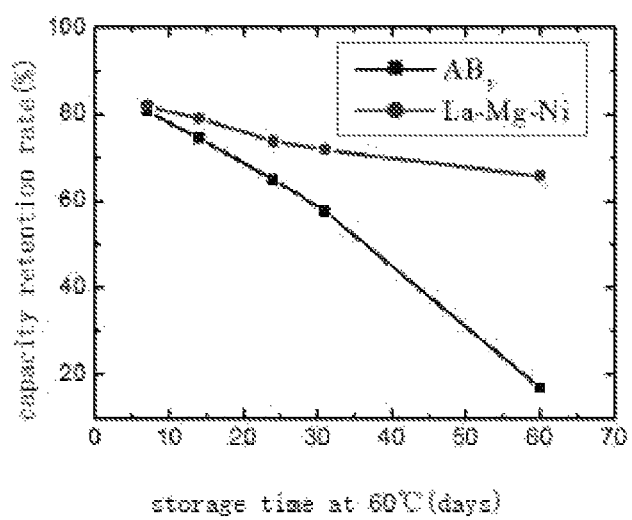
FIG. 2a is a graph of capacity change over time at 60° C. for batteries which are made of the hydrogen storage alloy of La—Mg—Ni type $La_{0.53}Pr_{0.03}Nd_{0.06}Mg_{0.38}(Ni_{0.96}Al_{0.04})_{2.80}$ in example 7 and $AB_5$ type $MmNi_{3.55}Co_{0.75}Mn_{0.4}Al_{0.3}$ in comparative example in the present invention.

The twenty-five batteries made of hydrogen storage material $La_{0.53}Pr_{0.03}Nd_{0.06}Mg_{0.38}(Ni_{0.96}Al_{0.04})_{2.80}$ of La—Mg—Ni type and hydrogen storage alloy $MmNi_{3.55}Co_{0.75}Mn_{0.4}Al_{0.3}$ of $AB_5$ type are taken and marked. Then these batteries are charged for 2 h at 0.5 C, and then charged for 2 h at 0.2 C and are discharged to 1V at 0.2 C at room temperature. Such cycle is performed for 3 times. The capacities of each battery are recorded, and the discharge capacity of the last time shall prevail. The batteries after being recorded are charged for 2 h at 0.5 C at room temperature, and then charged for 2 h at 0.2 C, and then stored in a thermo tank with the temperature of 60° C. Five batteries are respectively taken out on day 7, day 14, day 24, day 31 and day 60 after being stored, and are discharged to 1V with (at) 0.2 C at room temperature. Their capacities are recorded, and are divided by the discharge capacity of the last time recorded before storage to obtain the value that is capacity retention rate of the battery during the storage periods. The maximum and minimum are removed from the results of five batteries, and the results of the remaining three batteries are calculated to obtain the average value as the capacity retention rate of this battery. The results of the capacity retention rate are shown in FIG. 2a.

Figure 2B:
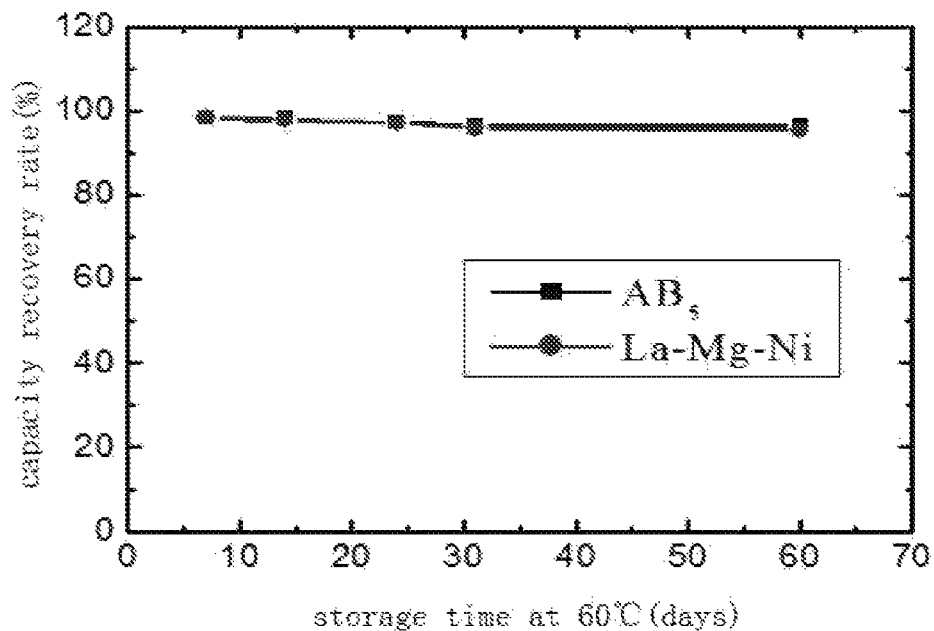
FIG. 2b is an capacity recovery characteristic diagram at 60° C. for batteries which are made of the hydrogen storage alloy of La—Mg—Ni type $La_{0.53}Pr_{0.03}Nd_{0.06}Mg_{0.38}(Ni_{0.96}Al_{0.04})_{2.80}$ in example 7 and $AB_5$ type $MmNi_{3.55}Co_{0.75}Mn_{0.4}Al_{0.3}$ in comparative example in the present invention.

Then these batteries are charged for 2 h at 0.5 C, charged for 2 h at 0.2 C and are discharged to 1V at 0.2 C at room temperature. Such cycle is done for 2 times. The results of capacity obtained in the second cycle are divided by the discharge capacity of the last time recorded before storage to obtain the value that is capacity recovery rate of the battery during the storage periods. The results of the capacity recovery rate are shown in FIG. 2b.

Figure 2C:
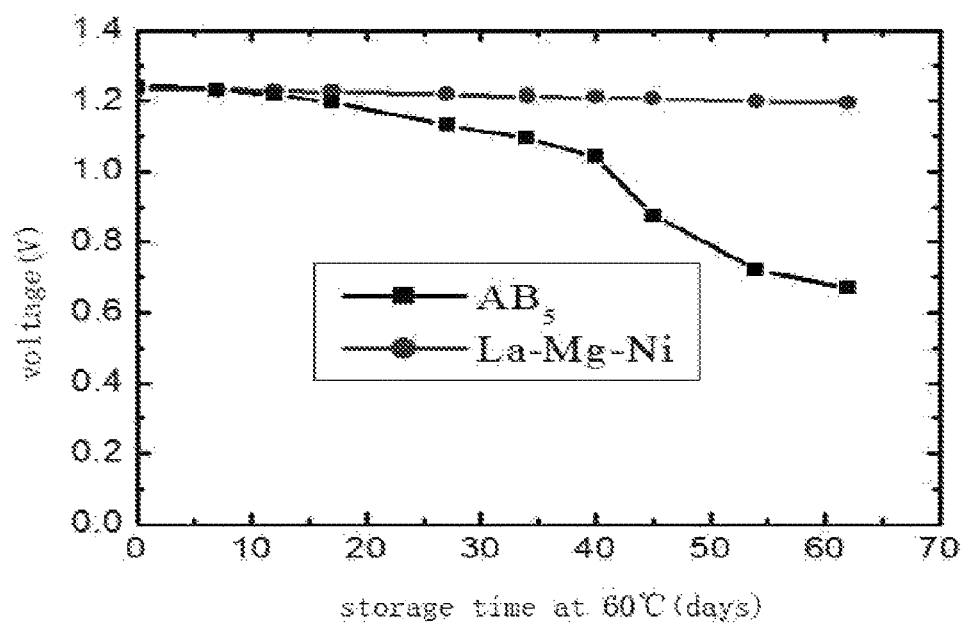
FIG. 2c is a graph of discharge voltage change over time at 60° C. for batteries which are made of the hydrogen storage alloy of La—Mg—Ni type $La_{0.53}Pr_{0.03}Nd_{0.06}Mg_{0.38}(Ni_{0.96}Al_{0.04})_{2.80}$ in example 7 and $AB_5$ type $MmNi_{3.55}Co_{0.75}Mn_{0.4}Al_{0.3}$ in comparative example in the present invention.

(i) Test of a discharge state voltage storage characteristics:

The forty-five batteries made of hydrogen storage material La0.53Pr0.03Nd0.06Mg0.38(Ni0.96Al0.04)$_{2.80}$ of La—Mg—Ni type and hydrogen storage alloy MmNi3.55Co0.75Mn0.4Al0.3 of AB5 type are taken and marked. Then these batteries are charged for 2 h at 0.5 C, then charged for 2 h at 0.2 C, are discharged to 1V at 0.2 C and are placed for 20 min at room temperature. Such cycle is performed for 3 times. The voltage is recorded after each battery is discharged and placed for 20 min in each cycle, and the voltage of the last time shall prevail. The batteries after being recorded are stored in a thermo tank with the temperature of 60° C. Five batteries are respectively taken out on day 7, day 12, day 17, day 27, day 34, day 40, day 45, day 54, day 62 after being stored, and are placed for 1 h at room temperature. Then the voltage of each battery is measured, and that is the discharge state voltage storage characteristics of the battery during the storage period. The maximum and minimum are removed from the results of five batteries, and the results of the remaining three batteries are calculated to obtain the average value as the discharge voltage storage characteristics of this battery. The results are shown in FIG. 2c.

It can be seen from the figure that compared with the battery made of hydrogen storage alloy MmNi$_{3.55}$Co$_{0.75}$Mn$_{0.4}$Al$_{0.3}$ of AB$_5$ type, the battery made of alloy La$_{0.53}$Pr$_{0.03}$Nd$_{0.06}$Mg$_{0.38}$(Ni$_{0.96}$Al$_{0.04}$)$_{2.80}$ of La—Mg—Ni type in the present invention maintains a higher level in the capacity retention rate and capacity recovery rate as well as discharge state voltage storage characteristics. Especially there are significant advantages in the capacity retention rate and discharge state voltage storage characteristics. So this alloy in the present invention is also suitable for making nickel-metal hydride batteries with ultra-low self-discharge and long-term storage performance.

The invention claimed is:

1. A high-capacity and long-life negative electrode hydrogen storage material of La—Mg—Ni type for secondary rechargeable nickel-metal hydride battery,
wherein: the chemical formula of the negative electrode hydrogen storage material of La—Mg—Ni type is

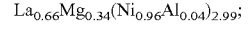

La$_{0.66}$Mg$_{0.34}$(Ni$_{0.96}$Al$_{0.04}$)$_{2.99}$;

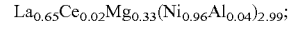

La$_{0.65}$Ce$_{0.02}$Mg$_{0.33}$(Ni$_{0.96}$Al$_{0.04}$)$_{2.99}$;

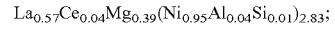

La$_{0.57}$Ce$_{0.04}$Mg$_{0.39}$(Ni$_{0.95}$Al$_{0.04}$Si$_{0.01}$)$_{2.83}$;

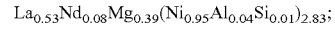

La$_{0.53}$Nd$_{0.08}$Mg$_{0.39}$(Ni$_{0.95}$Al$_{0.04}$Si$_{0.01}$)$_{2.83}$;

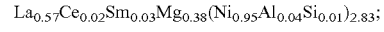

La$_{0.57}$Ce$_{0.02}$Sm$_{0.03}$Mg$_{0.38}$(Ni$_{0.95}$Al$_{0.04}$Si$_{0.01}$)$_{2.83}$;

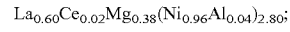

La$_{0.60}$Ce$_{0.02}$Mg$_{0.38}$(Ni$_{0.96}$Al$_{0.04}$)$_{2.80}$;

La$_{0.53}$Pr$_{0.03}$Nd$_{0.06}$Mg$_{0.38}$(Ni$_{0.96}$Al$_{0.04}$)$_{2.80}$;

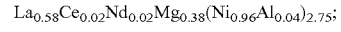

La$_{0.58}$Ce$_{0.02}$Nd$_{0.02}$Mg$_{0.38}$(Ni$_{0.96}$Al$_{0.04}$)$_{2.75}$;

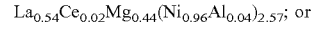

La$_{0.54}$Ce$_{0.02}$Mg$_{0.44}$(Ni$_{0.96}$Al$_{0.04}$)$_{2.57}$; or

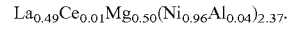

La$_{0.49}$Ce$_{0.01}$Mg$_{0.50}$(Ni$_{0.96}$Al$_{0.04}$)$_{2.37}$.

2. The negative electrode hydrogen storage material of La—Mg—Ni type according to claim 1, wherein: the negative electrode hydrogen storage material of La—Mg—Ni type includes LaMgNi$_4$ phase, LaMg$_{12}$ phase, Ce$_2$Ni$_7$-type La$_2$Ni$_7$ phase and LaNi$_5$ phase.

3. A secondary rechargeable nickel-metal hydride battery which comprises the high-capacity and long-life negative electrode hydrogen storage material comprising the La—Mg—Ni type material cited in claim 1.

* * * * *